US010746576B1

(12) United States Patent
Oh

(10) Patent No.: US 10,746,576 B1
(45) Date of Patent: Aug. 18, 2020

(54) PORTABLE AIR FLOW METER FABRICATED USING 3D PRINTER

(71) Applicant: Seoul Industry Engineering Co., Ltd., Namyangju-si, Gyeonggi-do (KR)

(72) Inventor: Sang Taek Oh, Namyangju-si (KR)

(73) Assignee: Seoul Industry Engineering Co., Ltd., Namyangju-si, Gyeonggi-do (KR)

( * ) Notice: Subject to any disclaimer, the term of this patent is extended or adjusted under 35 U.S.C. 154(b) by 0 days.

(21) Appl. No.: 16/426,553

(22) Filed: May 30, 2019

(51) Int. Cl.
| G01F 1/10 | (2006.01) |
| G01F 1/12 | (2006.01) |
| G01F 1/11 | (2006.01) |
| G01F 1/46 | (2006.01) |
| G01F 1/40 | (2006.01) |
| G01F 1/42 | (2006.01) |
| G01F 1/37 | (2006.01) |
| B33Y 80/00 | (2015.01) |

(52) U.S. Cl.
CPC ............... *G01F 1/42* (2013.01); *G01F 1/375* (2013.01); *B33Y 80/00* (2014.12)

(58) Field of Classification Search
CPC ..... G01F 1/10; G01F 1/12; G01F 1/11; G01F 1/46; G01F 1/40
See application file for complete search history.

(56) References Cited

U.S. PATENT DOCUMENTS

| 3,455,161 | A | * | 7/1969 | Randall | G01F 1/40 73/861.53 |
| 3,751,982 | A | * | 8/1973 | Lambert | G01F 1/46 73/861.66 |
| 3,862,628 | A | * | 1/1975 | Williams | A61B 5/0871 600/540 |
| 4,184,466 | A | * | 1/1980 | Nagele | F02M 69/04 123/445 |
| 5,565,630 | A | * | 10/1996 | Shene | A61B 5/0871 73/861.53 |
| 5,689,071 | A | * | 11/1997 | Ruffner | G01F 1/115 73/861.84 |
| 5,727,933 | A | * | 3/1998 | Laskaris | A62C 5/02 417/212 |
| 5,866,824 | A | * | 2/1999 | Schieber | G01F 1/05 73/861.79 |
| 6,314,822 | B1 | * | 11/2001 | Ford | A61B 5/0873 73/861.74 |
| 6,854,342 | B2 | * | 2/2005 | Payne | G01F 1/115 73/861.79 |
| 8,806,955 | B2 | * | 8/2014 | Wible | G01F 1/6842 73/861.04 |
| 2002/0148303 | A1 | * | 10/2002 | Lenzing | G01F 15/00 73/861.21 |

* cited by examiner

*Primary Examiner* — Jewel V Dowtin
(74) *Attorney, Agent, or Firm* — Rabin & Berdo, P.C.

(57) ABSTRACT

A portable air flow meter fabricated using a 3D printer. A nozzle cover, a fixing cover, and a handle are formed integrally with a cylindrical housing in which a multi-nozzle for measuring an air flow is installed. The cylindrical housing is fabricated using a 3D printer. Fabrication costs are reduced, and a fabrication period is reduced. The portable air flow meter has superior portability due to light weight, and is effective in terms of usability.

7 Claims, 15 Drawing Sheets

PORTABLE AIR FLOW METER FABRICATED USING 3D PRINTER

BACKGROUND

Field

The present disclosure relates generally to an air flow meter and, more particularly, to an air flow meter for measuring a quantity of air (an air flow) ejected from an air conditioning system for vehicles, an air conditioning system in buildings, or an air conditioning system for household electrical appliances.

Description

To measure an air flow of the air conditioning system for the vehicles, a simple measuring method using a hot wire, a vane air flow meter, or the like is used. However, it is difficult to move a typical air flow meter, due to a large volume and heavy weight thereof.

To overcome this problem, a portable air flow meter having a nozzle, fabricated on the basis of American Society of Heating, Refrigerating and Air-Conditioning Engineers (ASHRAE) Standard 51-1999, was developed. However, this portable air flow meter tends to have low measurement accuracy in a low air flow measurement range, due to high internal flow resistance, and high measurement errors in a high air flow measurement range, due to due to unstable flow. It is necessary to reduce such drawbacks.

That is, an improvement is required in the portable air flow meter of the related art in order to reduce measurement errors occurring in a low flow range (5 to 255 CMH) due to internal flow resistance and unstable flow. In addition, there is a problem of a slow data processing rate due to analog signal processing as well as a problem with measurement, correction, and maintenance for lack of self-diagnosis and control correction functions.

Further, since the portable air flow meter of the related art does not undergo static pressure correction, it has a problem that accurate measurement is impossible due to a change in quantity of air of an outlet during measurement, and a problem that it is difficult to measure an accurate status value of air with respect to a measured value because a temperature, a humidity, an atmospheric pressure, etc. are not taken into account.

Accordingly, it can be appreciated from above that there is a need to develop technology for measuring an air flow in various air conditioning systems as well as a market demand for the technology. However, current technology is insufficient and thus fails to satisfy the need and the market demand. Therefore, development of an air flow meter that enables accurate measurement, is lightweight for easy mobility, and is easily fabricated is urgently demanded.

The information disclosed in the Background section is only provided for a better understanding of the background and should not be taken as an acknowledgment or any form of suggestion that this information forms prior art that would already be known to a person having ordinary skill in the art.

BRIEF SUMMARY

Aspects of the present disclosure provide a portable air flow meter fabricated using a 3D printer, which can be easily molded using the 3D printer, is easily portable through a reduction in weight, and easily measures an air flow.

According to an aspect, a portable air flow meter fabricated using a 3D printer includes: a cylindrical housing having a nozzle cover formed integrally therewith in the front thereof into which air flows from an outside such that fabrication using the 3D printer is possible, a fixing cover on which a finishing cover is installed and which is integrally formed in the rear thereof, and a handle formed integrally therewith at an upper portion thereof; an inflow cover installed in front of the nozzle cover, formed to pass therethrough in an axial direction to cause the air flowing in from the outside to flow into the cylindrical housing, and having first flow straightening plates installed therein; a nozzle panel which is installed inside the nozzle cover and on which a multi-nozzle made up of nozzles that measure an air flow passing through the first flow straightening plates and have cross-sectional areas different from each other is detachably installed; a second flow straightening plate which is disposed behind the nozzle panel and on which cylinder type opening/closing devices moving dampers forward/backward to open/close the nozzles through the dampers are installed; and a blower disposed behind the second flow straightening plate, made up of a motor and an impeller rotatably connected coaxially with the motor, suctioning air passing through the second flow straightening plate, and ejecting the air to an ejector formed on a rear outer circumferential surface of the cylindrical housing. An air inductor disposed between the impeller and the second flow straightening plate to induce the air passing through the second flow straightening plate toward the blower is integrally formed inside the cylindrical housing.

Further, the portable air flow meter fabricated using a 3D printer according to an exemplary embodiment may further include an integrated pressure gauge adapter connected to the inflow cover through the flexible duct and causing open air to flow into the cylindrical housing. The integrated pressure gauge adapter includes: an adapter body in which an air inflow space into which the open air flows is provided and at an outer portion of which a fixing flange shaped of a quadrilateral frame is provided to fix the integrated pressure gauge adapter to a measuring target and to prevent leakage of the open air by bringing the integrated pressure gauge adapter into close contact with the measuring target; and a pressure gauge made up of a static pressure tap that includes a pressure measuring hole that is formed inside the adapter body in a circular shape to measure a pressure when the open air passes through the pressure measuring hole and an average pressure port that measures an average pressure of the open air flowing into the pressure measuring hole and that is integrally formed inside the adapter body.

Further, in the portable air flow meter fabricated using a 3D printer according to an exemplary embodiment, the integrated pressure gauge adapter may further include integrated grips that are formed to protrude from opposite sides of an outer surface of the adapter body.

Further, the portable air flow meter fabricated using a 3D printer according to an exemplary embodiment may further include a ring formed inside an inflow port of the inflow cover to protrude in a ring shape to fix a connecting means that connects the average pressure port and the sensor unit installed on the cylindrical housing for the purpose of preventing movement.

Further, in the portable air flow meter fabricated using a 3D printer according to an exemplary embodiment, the cylindrical housing may be formed integrally with pressure measuring pipes that connect a front sensor provided in the front of the cylindrical housing to constitute the sensor unit and rear sensors provided in the rear of the cylindrical housing Further, the portable air flow meter fabricated using a 3D printer according to an exemplary embodiment may further include an observation window for checking opening/closing of the nozzles, which is provided on a front outer circumferential surface of the cylindrical housing such that it is checked outside the cylindrical housing whether the multi-nozzle is opened or closed by the dampers and the cylinder type opening/closing devices for driving the dampers.

Further, the portable air flow meter fabricated using a 3D printer according to an exemplary embodiment may further include an ejecting direction turning adapter made up of a quadrilateral bracket that is formed at the same curvature as the ejector to turn an ejecting direction of internal air ejected through the ejector and is detachably installed outside the ejector, and an auxiliary ejection port that is formed integrally with the bracket and is formed in a cylindrical shape to communicate with the ejector.

Further, the portable air flow meter fabricated using a 3D printer according to an exemplary embodiment may further include a band-free fastener configured to fasten the flexible duct to the inflow cover in a band-free way. The band-free fastener includes: first and second cylindrical bodies configured such that rear ends thereof screwed onto the front of the inflow cover are integrally formed and front ends thereof which one end of the flexible duct formed of a corrugated tube enters are formed apart from each other; a first fixture that is formed to protrude inward from the first cylindrical body; and second and third fixtures that are formed to protrude outward from the second cylindrical body facing the first fixture and are disposed to alternate with the first fixture.

Further, in the portable air flow meter fabricated using a 3D printer according to the aspect, the band-free fastener may be formed integrally with the adapter body.

The above and other objects, features, and advantages of the present disclosure will be more clearly understood from the following detailed description, which serves to explain certain principles of the present disclosure.

In the meantime, terms and words used in the specification and the appended claims should not be interpreted as having ordinary or dictionary meanings, but as meanings and concepts conforming to the technical spirit of the present disclosure, based on the principle that an inventor may properly define the concept of the terms at his/her own discretion in order to describe the invention in the best manner possible.

According to an exemplary embodiment, since fabrication using a 3D printer is possible, it is possible to reduce fabrication costs and to reduce a fabrication period. Movement is easy through a reduction in weight, and thereby the present disclosure is effective in terms of usability.

Further, according to an exemplary embodiment, the static pressure tap that measures a static pressure of open air is formed integrally with the integrated pressure gauge adapter connected to the cylindrical housing through the flexible duct, and thereby accurate measurement of the static pressure is possible.

Further, according to an exemplary embodiment, the pressure measuring pipes are formed integrally with the cylindrical housing, and thereby fabrication costs and a fabrication period can be effectively reduced because fabrication using a 3D printer is possible.

Further, according to an exemplary embodiment, it can be easily checked outside the cylindrical housing without disassembling the cylindrical housing whether the multi-nozzle is opened or closed through the observation window for checking opening/closing of the nozzles, and thus it is possible to effectively improve usability.

Further, according to an exemplary embodiment, the ejecting direction turning adapter can be used while easily turning a direction in which the air flowing into the cylindrical housing is ejected, and thus it is possible to effectively improve usability of the portable air flow meter.

Further, according to an exemplary embodiment, the flexible duct can be easily fastened and connected to the inflow cover in a band-free way by the band-free fastener, and thus it is possible to effectively improve usability for measurement of an air flow.

DETAILED DESCRIPTION

Figure 1:
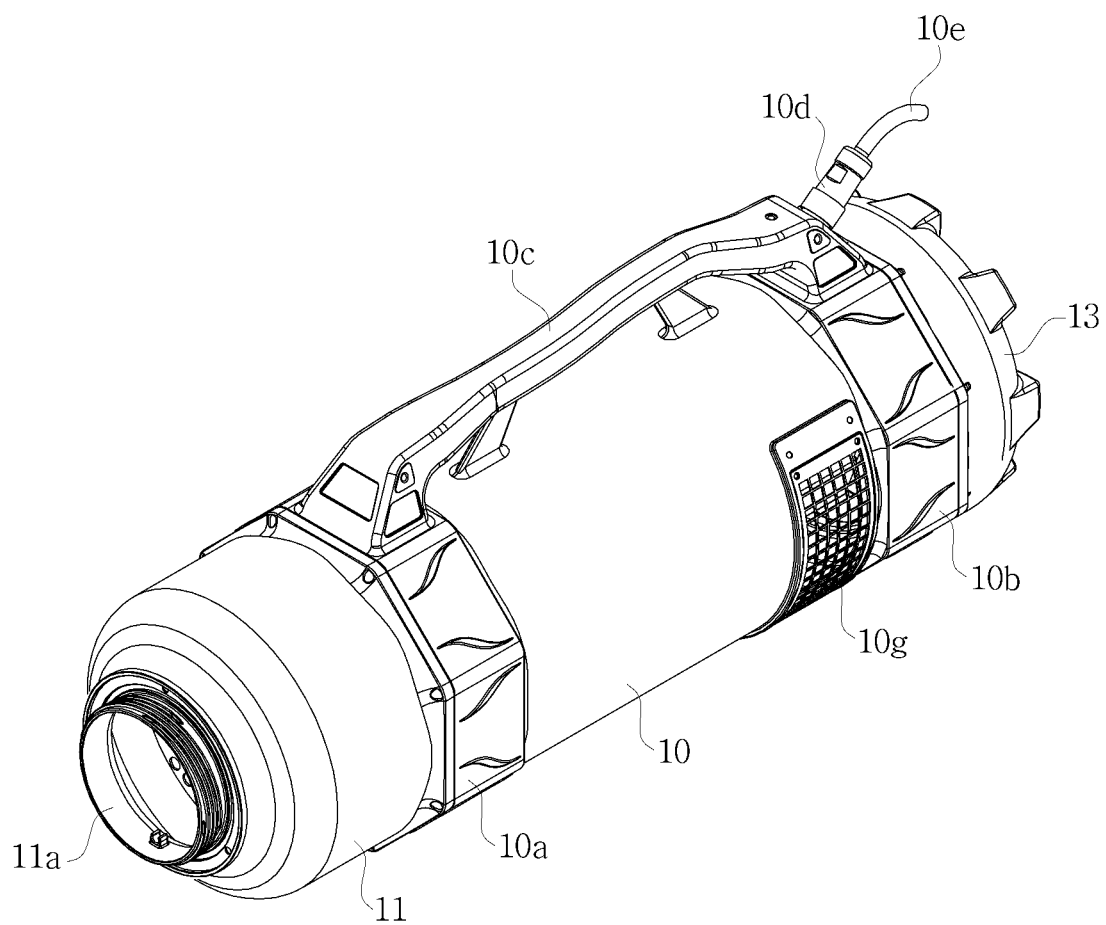
FIG. 1 is a perspective view illustrating an assembly of a portable air flow meter fabricated using a 3D printer according to an exemplary embodiment.

Reference should be made to the drawings, in which the same reference numerals and symbols may be used to designate the same or like components. In the following description of the present disclosure, detailed descriptions of known functions and components incorporated herein will be omitted in the case that the subject matter of the present disclosure may be rendered unclear thereby.

It will be understood that, while terms, such as "first," "second," "A," "B," "(a)," and "(b)," may be used herein to describe various elements, such terms are merely used to distinguish one element from another element. The substance, sequence, or order of such elements are not limited by these terms. It will be understood that when an element is referred to as being "connected to," "coupled to," or "joined to" another element, not only can it be "directly connected or coupled to" the other element, but it can also be "indirectly connected, coupled, or joined to" the other element via an "intervening" element.

A basic design structure of a portable air flow meter fabricated using a 3D printer according to an exemplary embodiment has been developed using a measuring nozzle based on ANSI/ASHRAE Standard 51-1999.

As is well known in the art, air has characteristics of a viscous fluid. When air is ejected from a duct or a fan, flow separation or an eddy phenomenon is inevitably caused due to a boundary layer effect. Thus, it is virtually impossible to measure an air flow on the basis of an average fluid velocity.

Further, according to ANSI/ASHRAE Standard 51-1999, since a fixed interval is placed before and behind the nozzle that is an air flow measurement sensor and a pipe connected to the outside is required to install a static pressure tap for measuring a pressure difference, a device is enlarged, and the external pipe has trouble in terms of maintenance and management. These factors are an obstacle to miniaturization, and it is necessary to develop a product that has a small size and is less prone to be damaged during movement in order to develop a portable air flow meter in which on-the-spot measurement is easy.

Therefore, to measure an air flow or aerodynamic performance of a fan or the like having medium and large air flow, a special air plenum according to ANSI/ASHRAE Standard 51-1999 is disposed, multipoint measurement is performed using a multi-nozzle method or using a Pitot tube in an outlet, and then, results of the multipoint measurement are averaged to calculate an average fluid velocity. Finally, the calculated average fluid velocity is converted into air flow. In another method, an air flow is measured using a method according to a differential pressure method according to ISO-5167.

The present disclosure has been conceived to systematically solve all of the above problems and allow easy and precise measurement to be applied in an industrial field. The present disclosure has been conceived based on ANSI/ASHRAE Standard 51-1999 that is the international standard industrial standard.

Hereinafter, an exemplary embodiment will be described below in detail on the basis of the attached drawings.

FIG. 1 is a perspective view illustrating an assembly of a portable air flow meter fabricated using a 3D printer according to an exemplary embodiment. In FIG. 1, a connection relation of a cylindrical housing 10, in the front of which an inflow cover 11 is installed through a nozzle cover 10a, in the rear of which a finishing cover 13 is installed through a fixing cover 10b, and at an upper portion of which a handle 10c is provided is shown.

Figure 2:
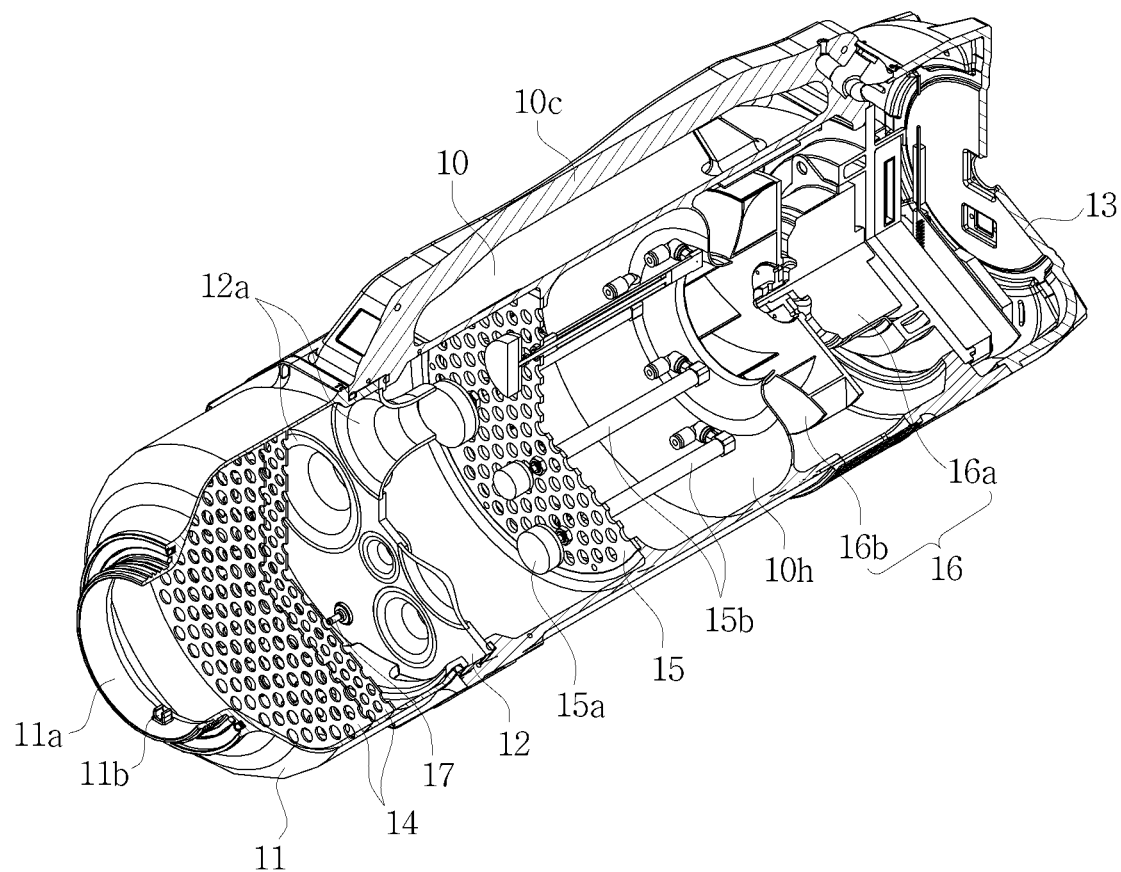
FIG. 2 is a cutaway perspective view illustrating an internal structure of the portable air flow meter fabricated using a 3D printer according to the exemplary embodiment.

FIG. 2 is a cutaway perspective view illustrating an internal structure of the portable air flow meter fabricated using a 3D printer according to the exemplary embodiment. In FIG. 2, a connection relation in which first flow straightening plates 14 are disposed in the front of the inside of the cylindrical housing 10, a nozzle panel 12 is disposed behind the first flow straightening plates 14, a second flow straightening plate 15 is disposed behind the nozzle panel 12, and a blower 16 is disposed behind the second flow straightening plate 15 is shown.

Figure 3:
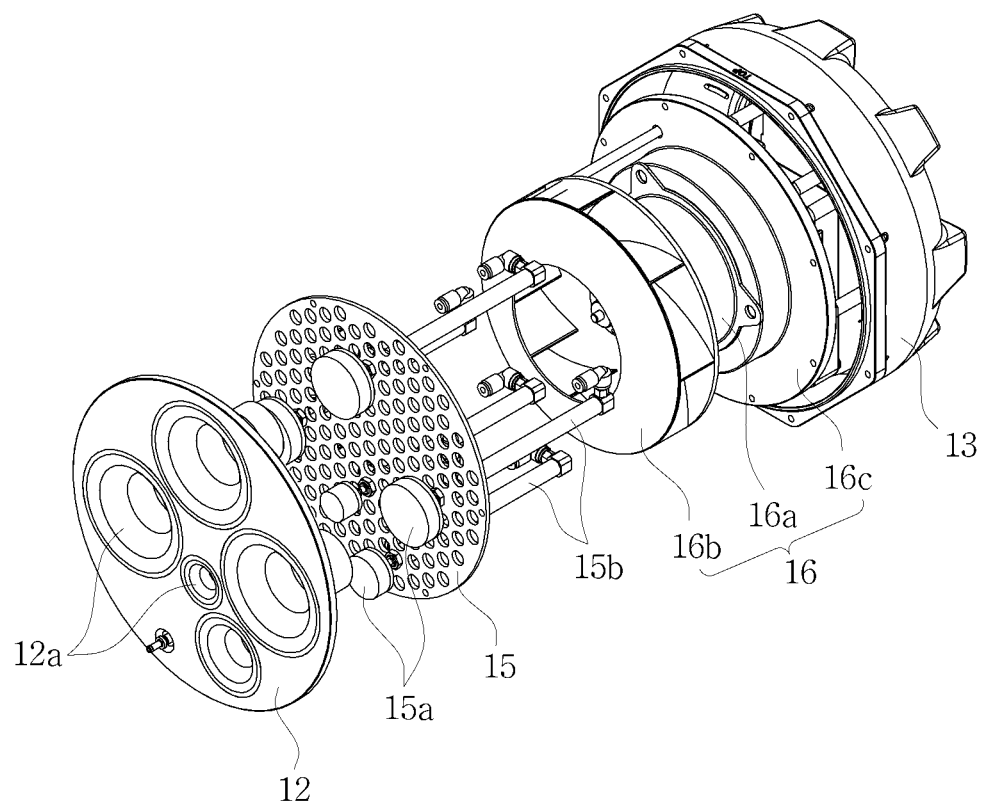
FIGS. 3 to 5 are perspective views illustrating key parts of the portable air flow meter fabricated using a 3D printer according to the exemplary embodiment.
Figure 4:
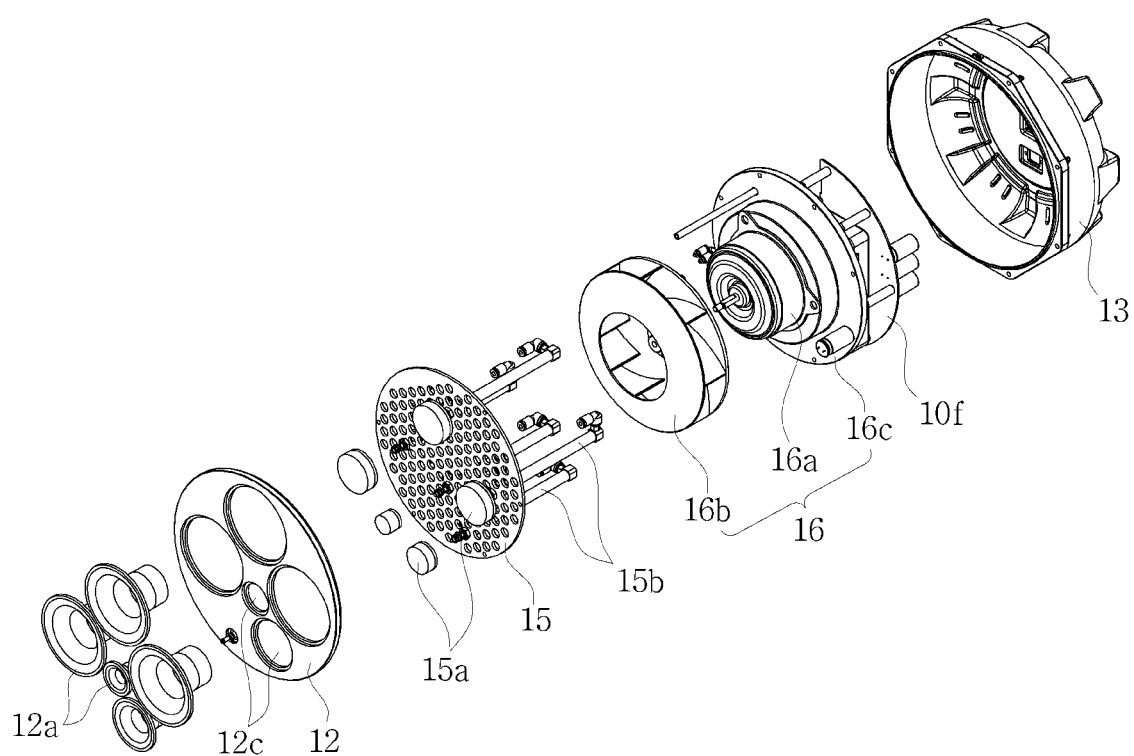
Figure 5:
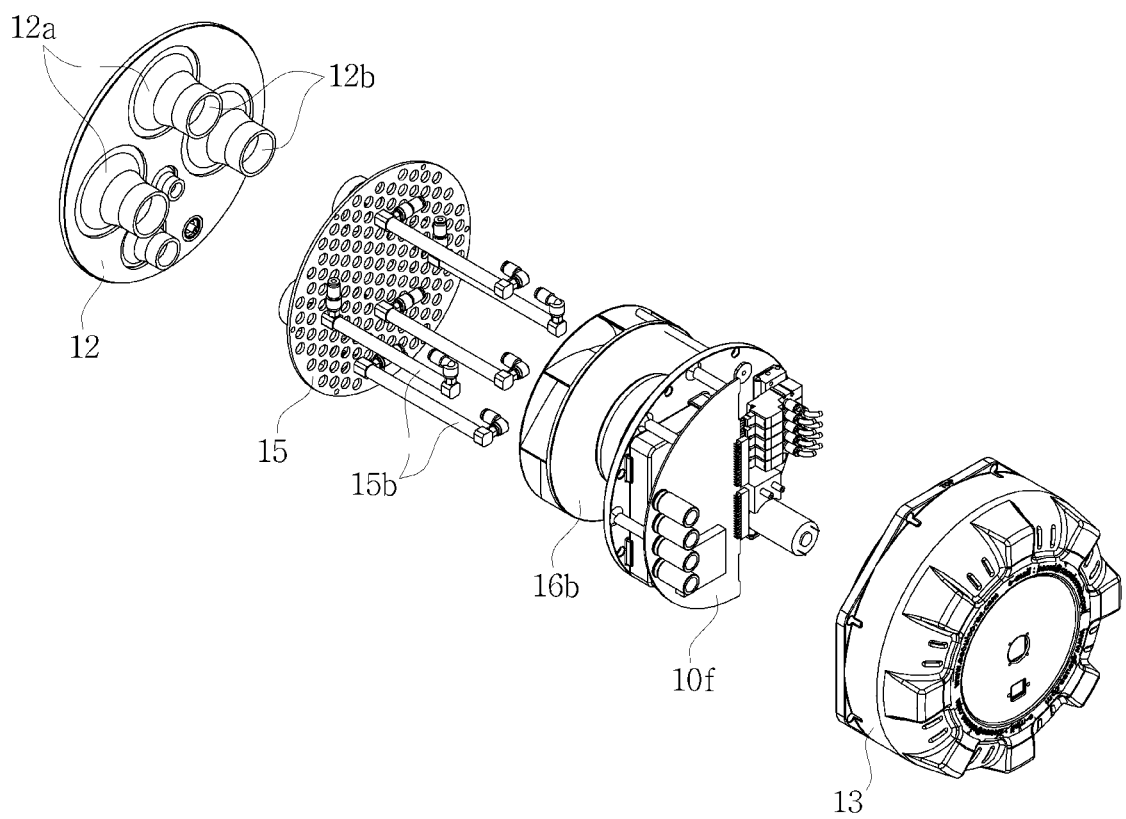

FIGS. 3 to 5 are perspective views illustrating key parts of the portable air flow meter fabricated using a 3D printer according to the exemplary embodiment. In FIGS. 3 to 5, a connection relation in which the second flow straightening plate 15 on which a dampers 15a and a cylinder type opening/closing devices 15b are installed is disposed behind the nozzle panel 12 on which a multi-nozzle 12a is detachably installed, the blower 16 made up of an impeller 16b and a motor 16a is disposed behind the second flow straightening plate 15, and a PCB 10f and the finishing cover 13 are disposed behind the blower 16 is shown.

As illustrated in FIGS. 1 to 5, the portable air flow meter fabricated using a 3D printer according to the exemplary embodiment includes the cylindrical housing 10. The cylindrical housing 10 is configured such that the nozzle cover 10a disposed in the front thereof into which air flows from the outside and the fixing cover 10b disposed in the rear thereof are formed integrally therewith and the handle 10c for making the air flow meter portable is formed integrally therewith at the upper portion thereof.

The cylindrical housing 10 is formed of a synthetic resin, and can be fabricated using a 3D printer. That is, since the nozzle cover 10a, the fixing cover 10b, and the handle 10c of the cylindrical housing 10 are formed integrally with one another, the cylindrical housing 10 can be easily fabricated using a 3D printer.

Here, the nozzle cover 10a has an outer surface formed in a polygonal shape, and is configured such that the inflow cover 11 is assembled in the front thereof and the nozzle panel 12 is assembled therein. The fixing cover 10b also has an outer surface formed in a polygonal shape, and is configured such that the finishing cover 13 is assembled in the rear thereof.

The inflow cover 11 and the finishing cover 13 are also formed of a synthetic resin like the cylindrical housing 10, and can be fabricated using, for example, a 3D printer.

The handle 10c formed integrally with the nozzle cover 10a and the fixing cover 10b is connected to a connector 10d in the rear thereof. A power supply cable 10e is connected to the connector 10d, thereby constituting a power supply unit. The power supply unit is electrically connected to a printed circuit board (PCB) 10f installed in the cylindrical housing 10.

An inflow port 11a is formed to pass through the inflow cover 11 in an axial direction such that air introduced from the outside flows toward the nozzle panel 12. The first flow straightening plates 14 is installed in the inflow cover 11. The nozzle panel 12 is inserted and installed in the inflow cover 11 such that the multi-nozzle made up of two or more nozzles can be attached or detached.

Each of the first flow straightening plates 14 is a kind of perforated plate configured to improve fluidity of air caused during suction through the inflow port 11a, and can be formed of asymmetric perforated plate in which an interval between holes increases from the center to the periphery for vortex of air flow, uniformity of fluid velocity distribution, and a reduction in pressure loss. The first flow straightening plates 14 are formed in a pair, are spaced apart from each other, and are disposed in front of the nozzle panel 12.

The multi-nozzle 12a is made up of two or more nozzles that are dispersedly disposed in and around the center of the nozzle panel 12, measures air flows flowing through the first flow straightening plates 14, and ejects air to an ejector 10g formed on a rear outer circumferential surface of the cylindrical housing 10. In addition, a temperature, humidity, and static pressure of the air can be measured.

Each nozzle is formed to pass through the nozzle panel 12 in an axial direction, and thereby air flow measurement holes 12b for measuring air flows are formed to pass through the centers of the nozzles. The nozzles are formed to be different in cross section from one another, and can be radially disposed, for example, around the smallest nozzle located in the center of the nozzle panel 12.

For example, the multi-nozzle 12a is made up of first to fifth nozzles in the figure to be different in cross section from one another, and is detachably installed on the nozzle panel 12. Thereby, the multi-nozzle 12a can measure various air flows by adjusting a necessary cross-sectional area according to an introduced air flow when measuring the air flows through the first to fifth nozzles and combinations thereof. For example, when a fluid velocity required to measure an air flow is 3 m/s, the air flow can be measured by a combination of the first and second nozzles.

This makes it possible to more accurately measure air flows by combining the various nozzles, compared to the related art in which an air flow is measured using a single nozzle.

Inserting holes 12c corresponding to the nozzles are formed to pass through the nozzle panel 12 such that the multi-nozzle 12a can be attached or detached. The inserting holes 12c can be sealed to increase a coupling force with the multi-nozzle 12a.

Such a sealing process can also be performed between the nozzle cover 10a and the inflow cover 11. In this case, an O-ring formed of silicone or a soft rubber material is interposed between the nozzle cover 10a and the inflow cover 11, and thereby easy measurement of an air flow is possible without a pressure loss.

Here, the nozzle cover 10a and the nozzle panel 12 may further include a warning sensor that sends a warning signal according to whether or not the multi-nozzle 12a is attached to the nozzle panel 12 to a controller.

That is, the warning signal according to whether or not the multi-nozzle 12a is attached is sent to the controller, and a user easily checks the attachment of the multi-nozzle through the controller. As a result, accurate air flow measurement can be performed.

The second flow straightening plate 15 is disposed behind the nozzle panel 12 to or from which the multi-nozzle 12a can be attached or detached. Dampers 15a corresponding to the nozzles and cylinder type opening/closing devices 15b moving the dampers 15a forward/backward are installed on the second flow straightening plate 15.

The dampers 15a are disposed behind the nozzles to be able to selectively open/close the multi-nozzle 12a according to an air flow introduced through the inflow port 11a, and open/close the multi-nozzle 12a while moving forward/backward along with driving of the cylinder type opening/closing devices 15b.

The blower 16 is disposed behind the second flow straightening plate 15. The blower 16 is made up of a motor 16a and an impeller 16b that is rotatably connected coaxially with the motor 16a, and is electrically connected to the PCB 10f installed in the cylindrical housing 10. Thereby, when power is supplied from a power supply unit, the blower 16 is driven to suction air, and ejects the air to the ejector 10g.

In addition, the blower 16 may further include a heat radiation plate 16c that dissipates heat generated when the motor 16a is driven. The heat radiation plate 16c is made of, for example, an aluminum material to enable a function as a kind of heat sink, and can be provided between the motor 16a and the PCB 10f to dissipate heat of the PCB 10f and heat of a semiconductor element that is a power module for electronic control.

Here, the cylindrical housing 10 has an air inductor 10h that is disposed between the impeller 16b and the second flow straightening plate 15 such that air flowing through the second flow straightening plate 15 easily flows into the impeller 16b and that is integrally formed therein.

That is, the air inductor 10h is a kind of partition, is formed integrally with the cylindrical housing 10 to be able to fabricate the cylindrical housing 10 using a 3D printer. The air inductor 10h has a hole formed in the center thereof in a streamlined shape to induce the air flowing through the second flow straightening plate 15 toward the impeller 16b, and thereby enables air to be easily suctioned through the blower 16.

Therefore, according to the exemplary embodiment, it is possible to fabricate the cylindrical housing 10 using a 3D printer, cut fabrication costs, and reduce a fabrication period, and it is easy to provide portability using the handle 10c due to light weight, so that the air flow meter for measuring an air flow ejected from an air conditioning system for vehicles, an air conditioning system in buildings, or an air conditioning system for household electrical appliances can be easily operated, which is effective in terms of usability.

Figure 6:
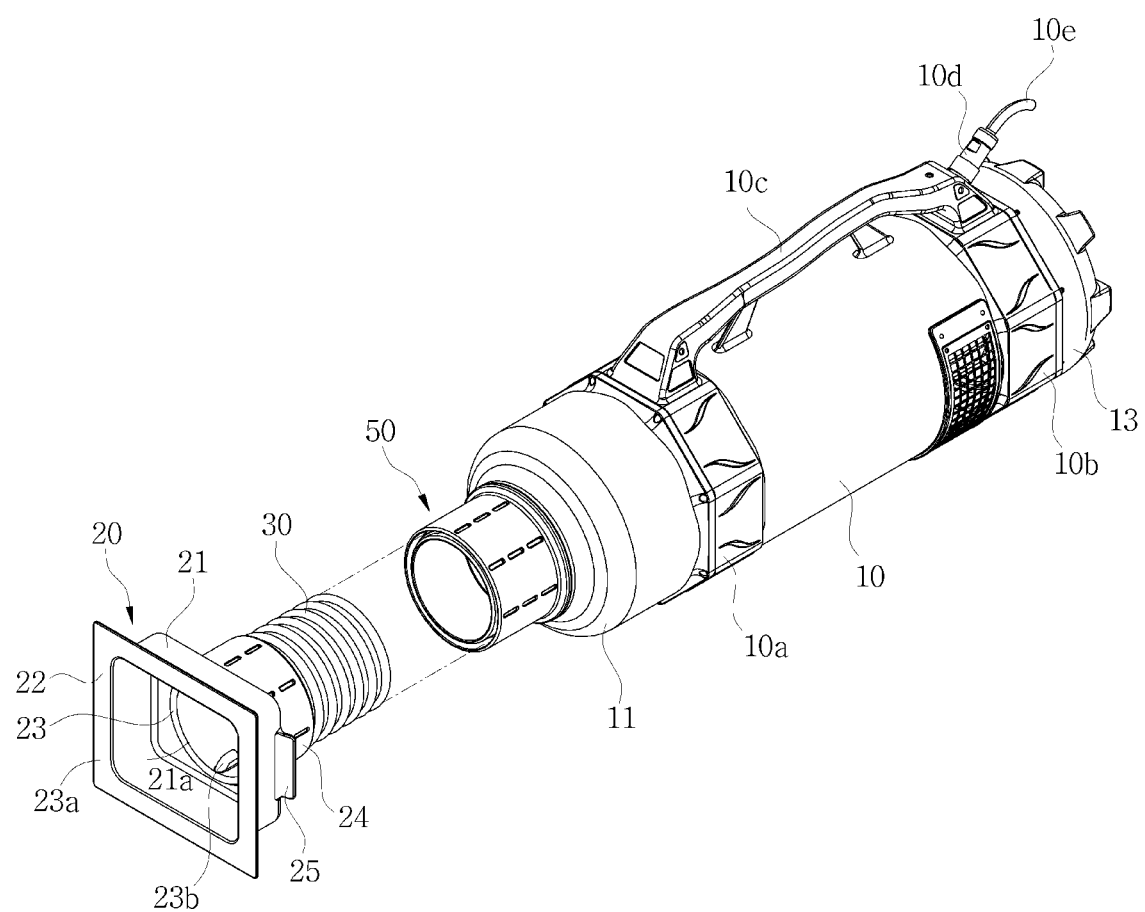
FIG. 6 is a perspective view illustrating the portable air flow meter fabricated using a 3D printer according to the exemplary embodiment.

FIG. 6 is a perspective view illustrating the portable air flow meter fabricated using a 3D printer according to the exemplary embodiment. In FIG. 6, a connection relation in which a flexible duct 30 is coupled through a band-free fastener 50 provided on the inflow cover 11 installed in the front of the cylindrical housing 10 and an integrated pressure gauge adapter 20 is coupled to the flexible duct 30 is shown.

Figure 7:
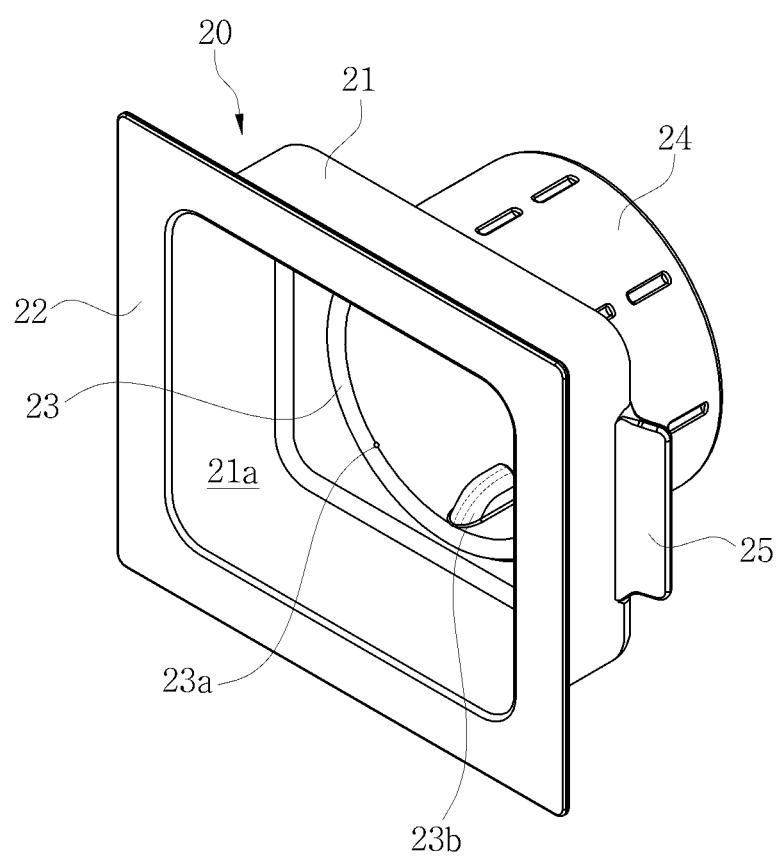
FIG. 7 is a perspective view illustrating an integrated pressure gauge adapter of the portable air flow meter fabricated using a 3D printer according to the exemplary embodiment.

FIG. 7 is a perspective view illustrating the integrated pressure gauge adapter 20 of the portable air flow meter fabricated using a 3D printer according to the exemplary embodiment. In FIG. 7, a static pressure tap 23 made up of a pressure measuring hole 23a for measuring a static pressure of open air and an average pressure port 23b is integrally formed inside the integrated pressure gauge adapter 20, and integrated grips 25 are provided on an outer surface of the integrated pressure gauge adapter 20.

Figure 8:
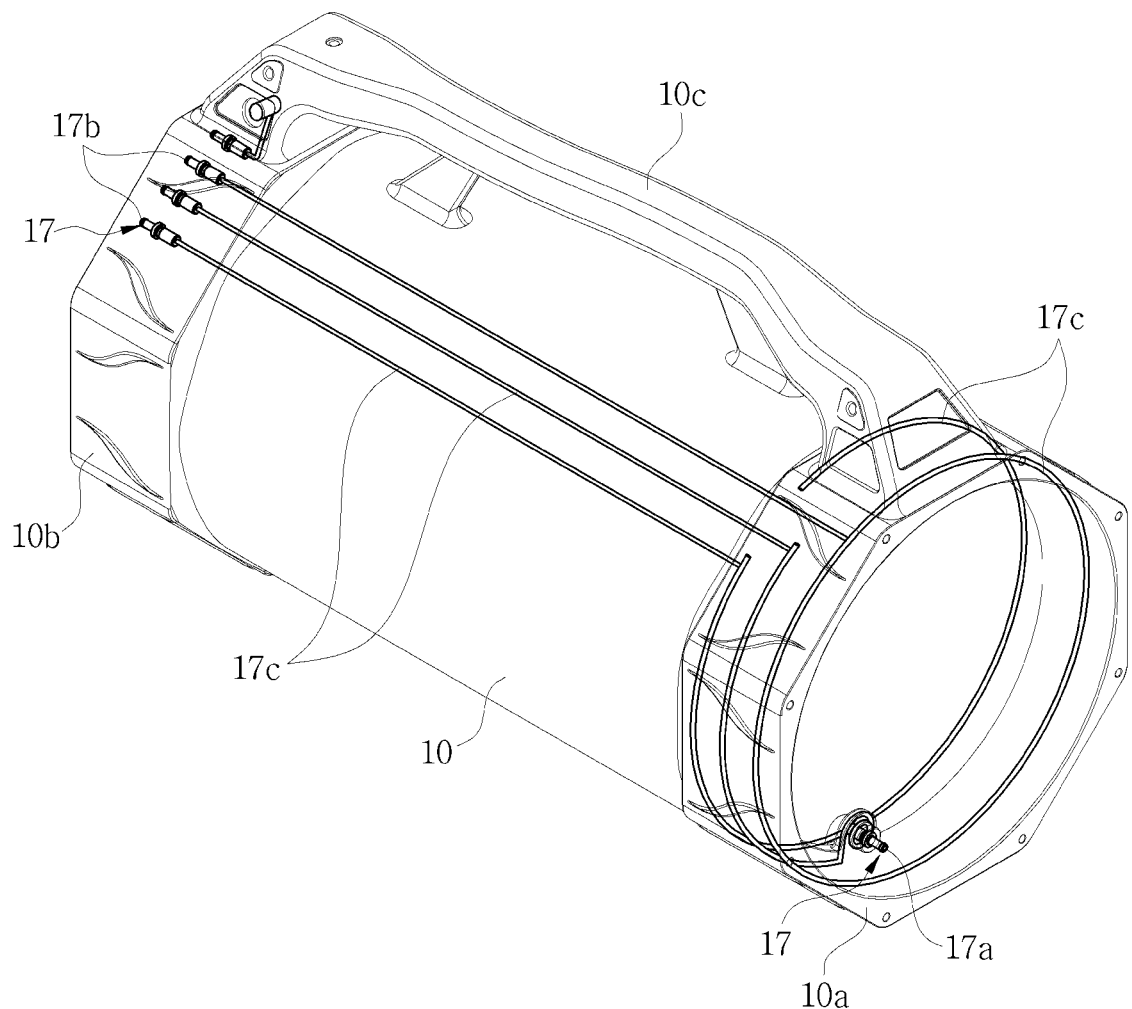
FIG. 8 is a perspective view illustrating a cylindrical housing of the portable air flow meter fabricated using a 3D printer according to the exemplary embodiment.

FIG. 8 is a perspective view illustrating the cylindrical housing 10 of the portable air flow meter fabricated using a 3D printer according to the exemplary embodiment. In FIG. 8, pressure measuring pipes 17c are formed integrally with the cylindrical housing 10 in which the nozzle cover 10a, the fixing cover 10b, and the handle 10c are integrally formed.

As illustrated in FIGS. 6 to 8, the portable air flow meter fabricated using a 3D printer according to the exemplary embodiment may include the integrated pressure gauge adapter 20 that causes open air to flow toward the cylindrical housing 10 and measures a static pressure of the open air.

The integrated pressure gauge adapter 20 includes an adapter body 21 in which an air inflow space 21a into which open air flows is provided and at an outer portion of which a fixing flange 22 shaped of a quadrilateral frame is provided to fix the integrated pressure gauge adapter 20 to a measuring target and to prevent leakage of the open air by bringing the integrated pressure gauge adapter 20 into close contact with the measuring target, and a pressure gauge made up of the static pressure tap 23 that is integrally formed inside the adapter body 21 and measures a pressure of the open air.

The adapter body 21 is formed of, for example, a synthetic resin in a quadrilateral shape, and is coupled with one end of the flexible duct 30 through a coupler 24 formed on the opposite side of the fixing flange 22. The integrated grips 25 are formed to protrude on both sides of the outer portion of the adapter body 21 to easily grasp and move the integrated pressure gauge adapter 20 to the measuring target.

The static pressure tap 23 is integrally formed inside the adapter body 21, and measures a quantity of air, a static pressure, and an average pressure when open air flows into the air inflow space 21*a* of the adapter body 21. That is, the integrated pressure gauge adapter 20 in which the static pressure tap 23 is integrally formed can be fabricated using a 3D printer.

Here, the static pressure tap 23 includes a pressure measuring hole 23*a* that is formed in a circular shape to be able to measure a pressure when open air passes through the pressure measuring hole 23*a*, and an average pressure port 23*b* that measures an average pressure of the open air flowing into the pressure measuring hole 23*a*.

The average pressure port 23*b* measures an average pressure of open air that flows into the air inflow space 21*a* and passes through the pressure measuring hole 23*a*. For example, the average pressure port 23*b* is connected to a sensor unit 17 installed on the cylindrical housing 10 through an air hose that is a connecting means in order to measure the average pressure of open air.

That is, the sensor unit 17 installed on the cylindrical housing 10 includes, for example, an ejected pressure sensor, a static pressure sensor, etc. to be able to easily measure the air passing through the pressure measuring hole 23*a* by way of the average pressure port 23*b*, and a manometer (not shown) for correcting an error in pressure generated when a static pressure is measured can be installed.

In addition, the sensor unit 17 may further include a temperature and humidity sensor for measuring a temperature and humidity of air, an atmospheric pressure sensor for measuring the atmospheric pressure, a differential pressure sensor for measuring a differential pressure between before and behind the nozzles, an ejected static pressure sensor for measuring a quantity and static pressure of air ejected through the blower, and so on.

Here, the cylindrical housing 10 is formed integrally with the pressure measuring pipes 17*c* that connect a front sensor 17*a* provided in the front of the cylindrical housing 10 to be easily coupled to the average pressure port 23*b* and rear sensors 17*b* provided in the rear of the cylindrical housing 10.

That is, connecting lines are required to transmit pressure data measured through the front sensor 17*a* constituting the sensor unit 17 to the rear sensors 17*b*. To this end, the pressure measuring pipes 17*c* are integrally formed on inner wall surfaces of the nozzle cover 10*a*, the cylindrical housing 10, and the fixing cover 10*b*, and thereby can be easily configured in the process of fabricating the cylindrical housing 10.

Therefore, according to the exemplary embodiment, a static pressure of air can be easily measured in the process of suctioning open air through the integrated pressure gauge adapter 20 connected through the cylindrical housing 10 and the flexible duct 30, and thereby the present disclosure is effective in terms of usability. Further, the pressure measuring pipes 17*c* are integrally formed in the cylindrical housing 10, and thereby the present disclosure is effective in the aspect of cost saving and a reduction in fabrication period because it can be fabricated using a 3D printer.

Figure 9:
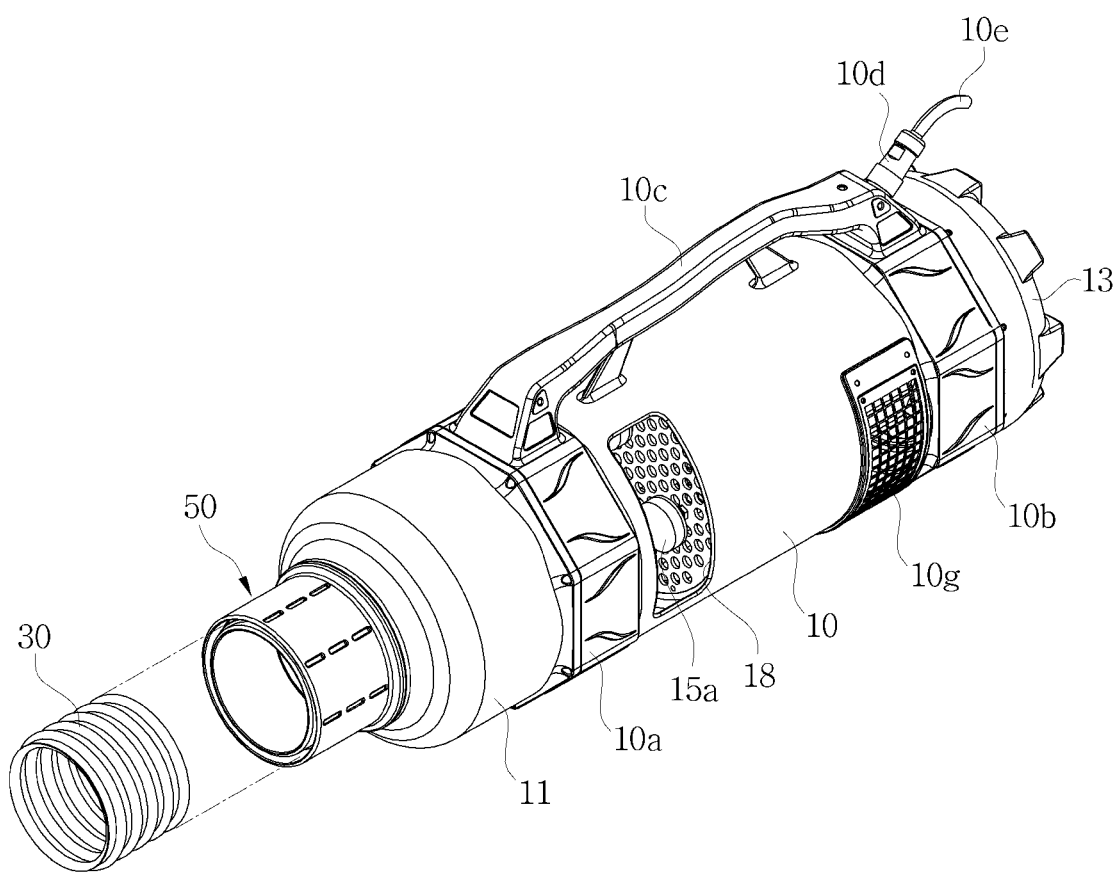
FIG. 9 is a perspective view illustrating the portable air flow meter fabricated using a 3D printer according to the exemplary embodiment.

FIG. 9 is a perspective view illustrating the portable air flow meter fabricated using a 3D printer according to the exemplary embodiment. In FIG. 9, a connection relation in which an observation window 18 for checking opening/closing of the nozzles is provided on a front outer circumferential surface of the cylindrical housing 10, in the front of which the flexible duct 30 is connected through the band-free fastener 50 is shown.

As illustrated in FIG. 9, the cylindrical housing 10 according to the exemplary embodiment may further include the observation window 18 for checking opening/closing of the nozzles is provided on the front outer circumferential surface thereof such that it can be easily checked outside the cylindrical housing 10 whether the multi-nozzle is opened or closed by the dampers 15*a* and the cylinder type opening/closing devices for driving the dampers 15*a*.

That is, the front outer circumferential surface of the cylindrical housing 10 is formed, for example, in a quadrilateral shape, and the observation window 18 for checking opening/closing of the nozzles is formed of a transparent material such as glass or plastic with the same curvature or shape as the quadrilateral front outer circumferential surface, and is installed on the outer circumferential surface of the cylindrical housing 10.

Therefore, according to the exemplary embodiment, it can be easily checked outside the cylindrical housing 10 without disassembling the cylindrical housing 10 whether the multi-nozzle is opened or closed through the observation window 18 for checking opening/closing of the nozzles that is provided on the outer circumferential surface of the cylindrical housing 10, and thereby the present disclosure is effective in terms of usability.

Figure 10:
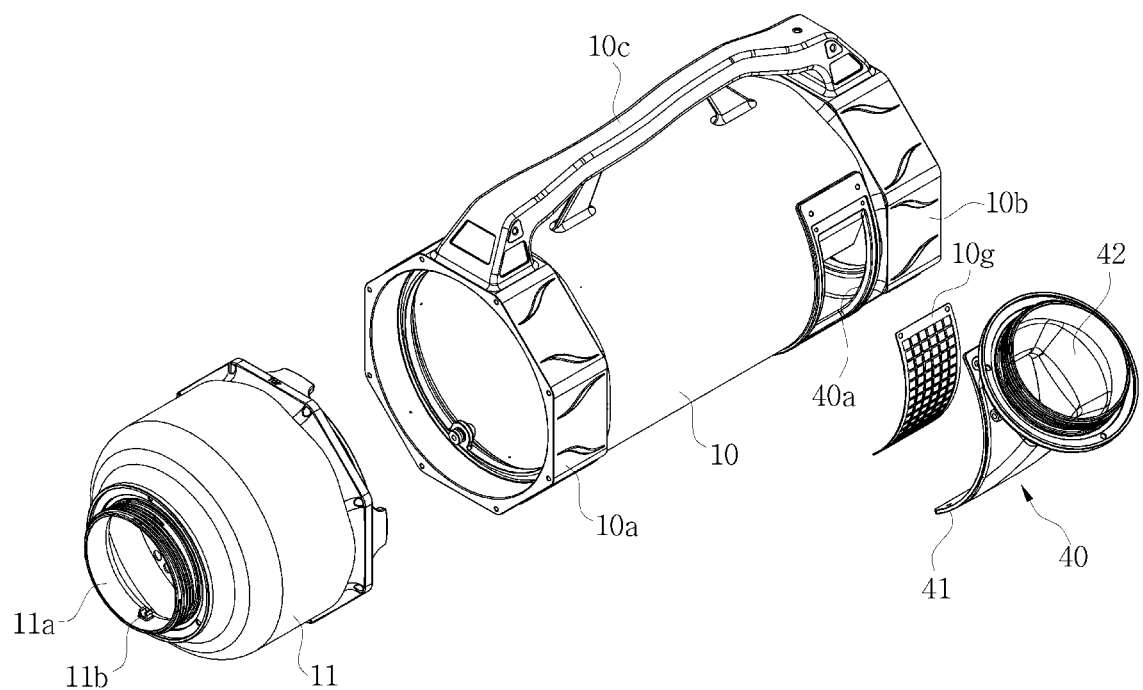
FIG. 10 is an exploded perspective view illustrating the portable air flow meter fabricated using a 3D printer according to the exemplary embodiment.

FIG. 10 is an exploded perspective view illustrating the portable air flow meter fabricated using a 3D printer according to the exemplary embodiment. In FIG. 10, a connection relation in which an ejection port 40*a* is formed in a rear outer circumferential surface of the cylindrical housing 10, the ejector 10*g* is detachably provided on the ejection port 40*a*, and an ejecting direction turning adapter 40 is detachably provided on the ejector 10*g* is shown.

Figure 11:
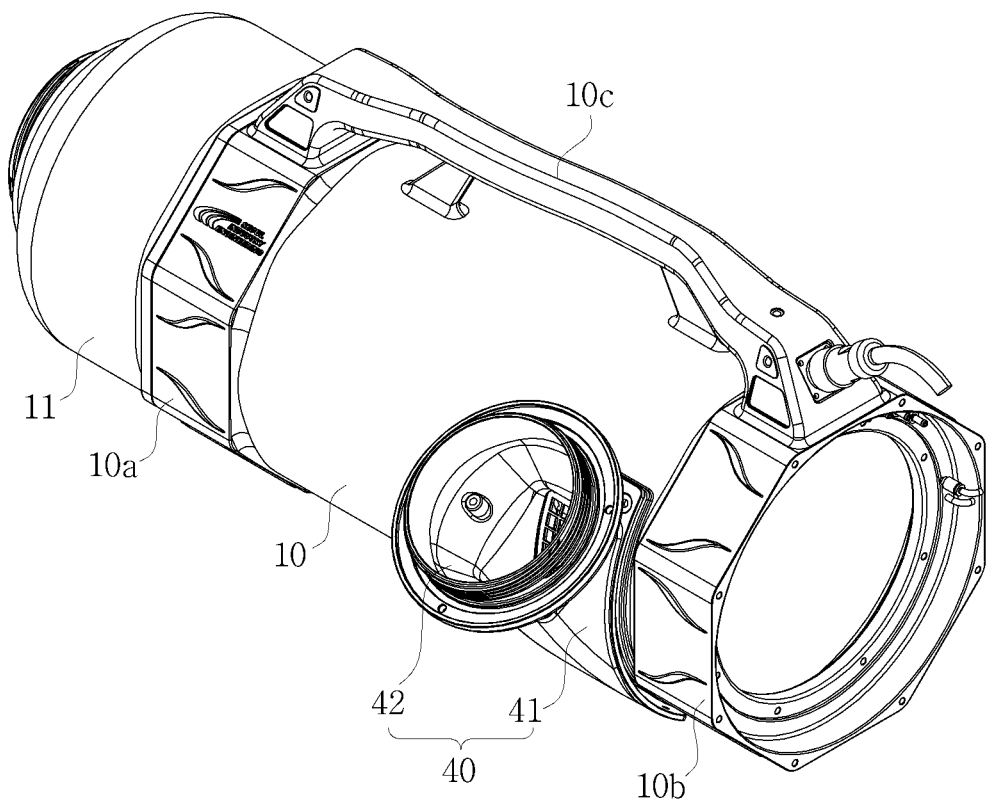
FIG. 11 is a perspective view illustrating the portable air flow meter of FIG. 10 from behind.

FIG. 11 is a perspective view illustrating the portable air flow meter of FIG. 10 from behind. In FIG. 11, a connection relation in which the ejecting direction turning adapter 40 is installed on the rear outer circumferential surface of the cylindrical housing 10 is shown.

Figure 12:
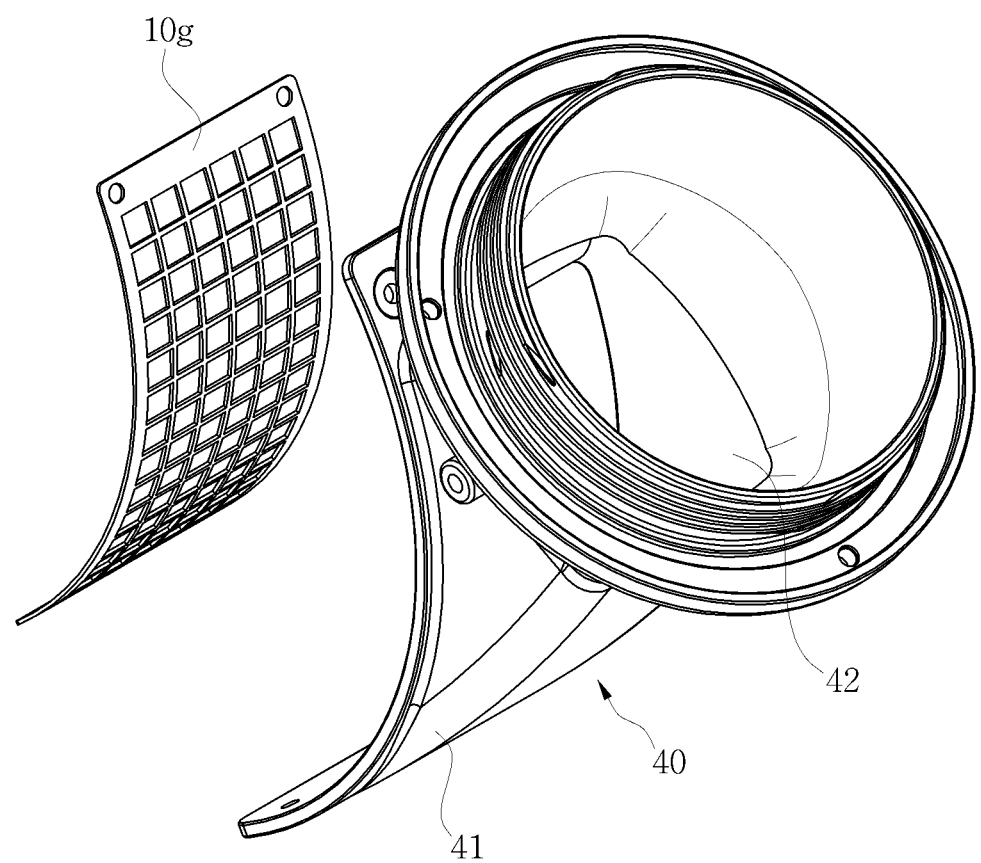
FIG. 12 is a perspective view illustrating an ejecting direction turning adapter of the portable air flow meter fabricated using a 3D printer according to the exemplary embodiment.

FIG. 12 is an exploded perspective view illustrating the ejecting direction turning adapter 40 of the portable air flow meter fabricated using a 3D printer according to the exemplary embodiment. A configuration of the ejecting direction turning adapter 40 made up of a bracket 41 that is detachably installed on the ejector 10*g* and an auxiliary ejection port 42 that is formed integrally with the bracket 41 is shown.

As illustrated in FIGS. 10 to 12, the cylindrical housing 10 according to the exemplary embodiment may further include the ejecting direction turning adapter 40 that is detachably installed on the ejector 10*g* to be able to easily turn an ejecting direction of internal air ejected through the ejector 10*g*.

That is, the rear outer circumferential surface of the cylindrical housing 10 is formed, for example, in a quadrilateral shape to form the ejection port 40*a*, and the ejector 10*g* made up of a cover formed at or in the same curvature or shape as the ejection port 40*a* is detachably installed on the ejection port 40*a*. Thereby, the internal air of the cylindrical housing 10 is ejected to the outside.

Here, the ejecting direction turning adapter 40 made up of the bracket 41 and the auxiliary ejection port 42 that is formed integrally with the bracket 41 and is formed in a cylindrical shape to communicate with the ejector 10*g* in a direction intersecting the ejector 10*g* is detachably installed outside the ejector 10*g*, and thereby easily turns the direction in which internal air of the cylindrical housing 10 is ejected.

That is, the ejecting direction turning adapter 40 is used while easily turning an ejecting direction of the auxiliary ejection port 42 upward or downward through the bracket 41 formed at the same curvature as the ejector 10g. An outer circumferential surface of the auxiliary ejection port 42 is threaded, and thereby a hose or a pipe for ejecting internal air can be easily connected.

Therefore, according to the exemplary embodiment, the ejecting direction turning adapter 40 provided on the rear outer circumferential surface of the cylindrical housing 10 can be used while easily turning the direction in which the internal air of the cylindrical housing 10 is ejected, and the present disclosure is effective in terms of usability.

Figure 13:
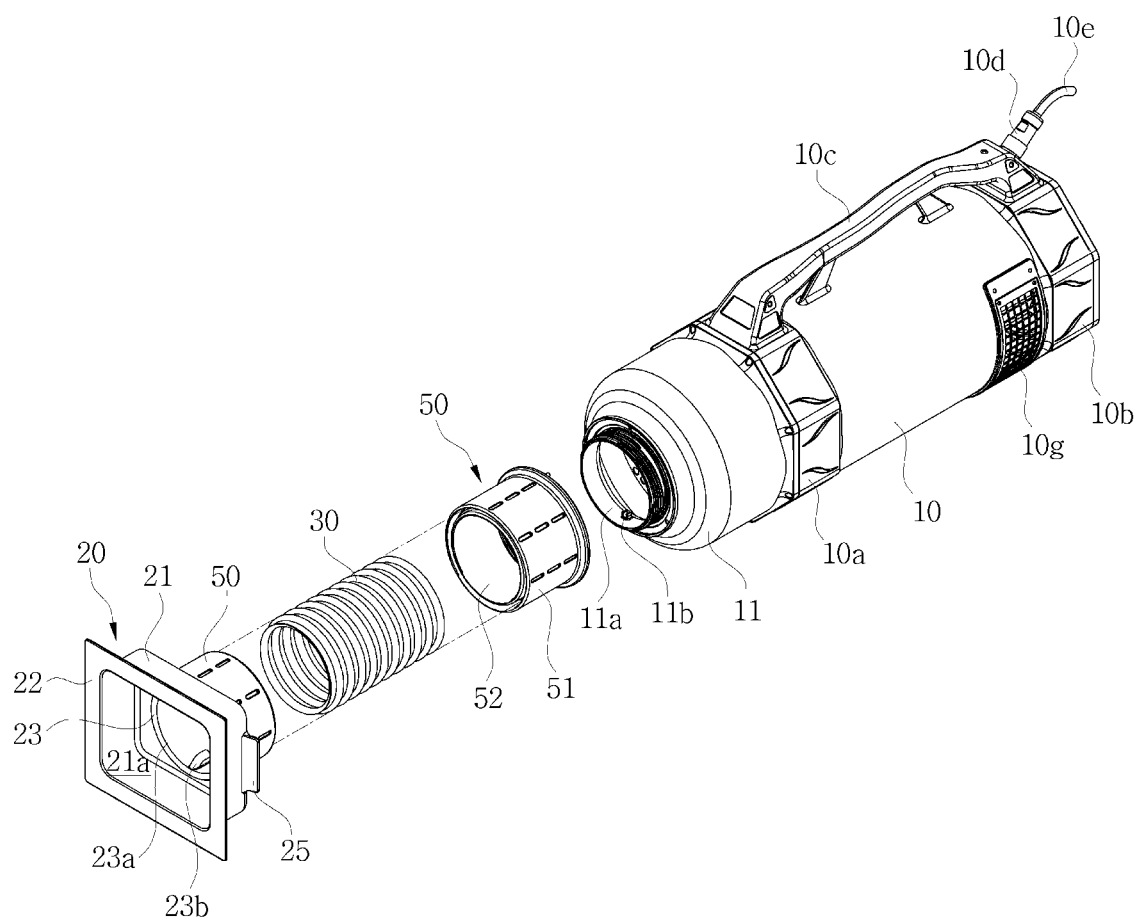
FIG. 13 is an exploded perspective view illustrating the portable air flow meter fabricated using a 3D printer according to the exemplary embodiment.

FIG. 13 is an exploded perspective view illustrating the portable air flow meter fabricated using a 3D printer according to the exemplary embodiment. In FIG. 13, a connection relation in which the band-free fastener 50 is fastened to the inflow cover 11 installed in the front of the cylindrical housing 10, the flexible duct 30 is connected in the front of the band-free fastener 50, and the integrated pressure gauge adapter 20 is connected in the front of the flexible duct 30 is shown.

Figure 14:
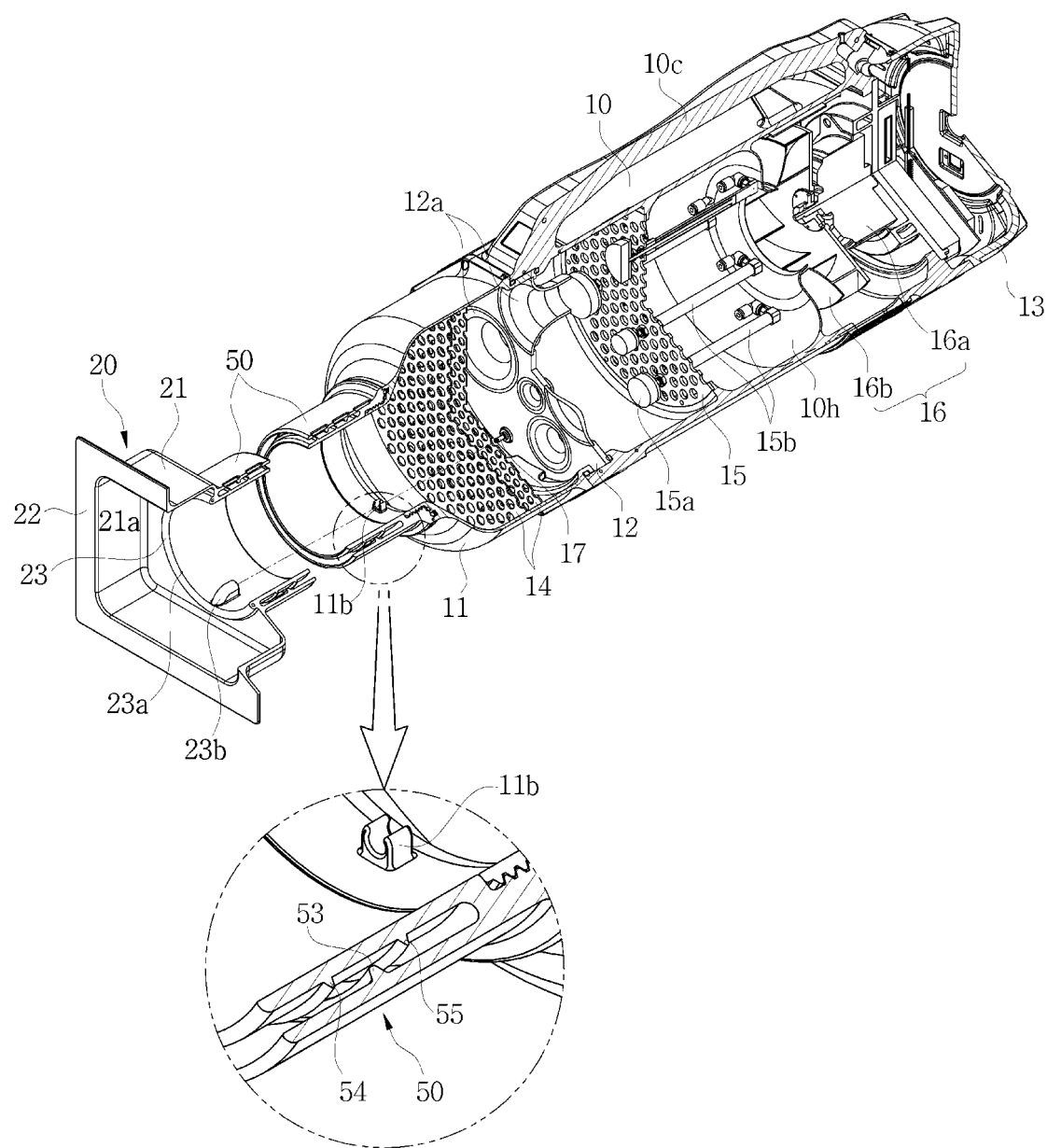
FIG. 14 is a cutaway perspective view illustrating an internal structure of the portable air flow meter of FIG. 13.

FIG. 14 is a cutaway perspective view illustrating an internal structure of the portable air flow meter of FIG. 13. In FIG. 14, a fastening structure of the band-free fastener 50 fastened to the front of the inflow cover 11 and a fastening structure of the integrated pressure gauge adapter 20 formed to face the band-free fastener 50 are shown.

Figure 15:
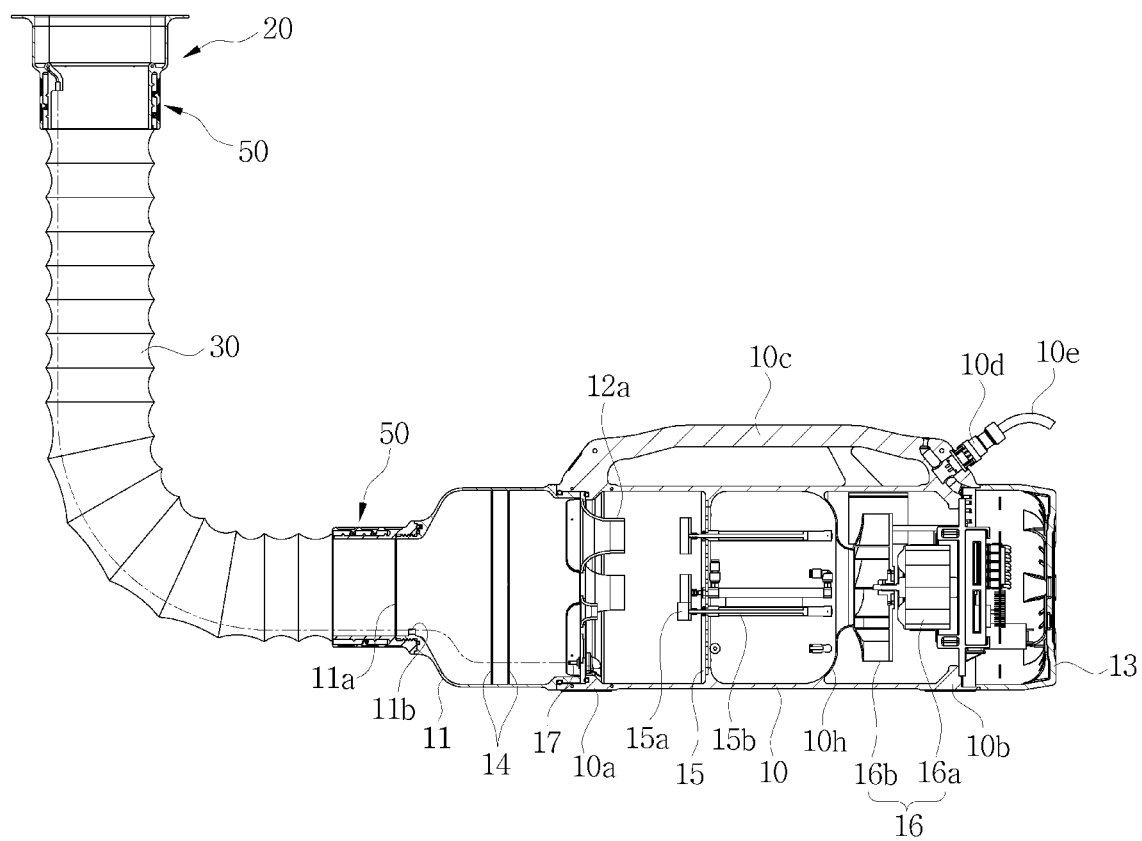
FIG. 15 is a cutaway perspective view illustrating an internal structure of the portable air flow meter of FIG. 13.

FIG. 15 is a cutaway perspective view illustrating an internal structure of the portable air flow meter of FIG. 13. In FIG. 15, the internal structure of the portable air flow meter for measuring an air flow of open air introduced through the integrated pressure gauge adapter 20 that can be used while turning a direction through the flexible duct 30 fastened to the band-free fastener 50 is shown.

As illustrated in FIGS. 13 to 15, the portable air flow meter fabricated using a 3D printer according to the exemplary embodiment may further include the flexible duct 30 that connects the inflow cover 11 installed in the front of the cylindrical housing 10 and the integrated pressure gauge adapter 20 causing open air to flow into the cylindrical housing 10, and the band-free fastener 50 that fastens the flexible duct 30 to the inflow cover 11 in a band-free way.

The flexible duct 30 is formed of a corrugated tube in a circumference of which furrows and ridges are repeated in a longitudinal direction thereof such that length adjustment and turning are easy, and opposite ends thereof are connected to the adapter body 21 and the inflow cover 11. The flexible duct 30 enables the integrated pressure gauge adapter 20 to easily move to a measuring target, for example a ceiling of a building in which an air conditioning system is installed.

Here, the flexible duct 30 is generally fastened and connected to the inflow cover 11 and the adapter body 21, for example, through a band or an adhesive tape.

The band-free fastener 50 easily fastens and connects the flexible duct 30 to the inflow cover 11 without using a band or an adhesive tape by improving this ordinary fastening structure.

That is, the band-free fastener 50 includes first and second cylindrical bodies 51 and 52 that are screwed onto the front of the inflow cover 11. The band-free fastener 50 includes a first fixture 53 that is formed to protrude inward from the first cylindrical body 51, and second and third fixtures 54 and 55 that are formed to protrude outward from the second cylindrical body 52 facing the first fixture 53 and are disposed to alternate with the first fixture 53.

The first and second cylindrical bodies 51 and 52 are configured such that rear ends thereof screwed onto the front of the inflow cover 11 are integrally formed and front ends thereof are formed apart from each other such that one end of the flexible duct 30 can enter.

Thus, when one end of the flexible duct 30 enters between the first and second cylindrical bodies 51 and 52, the first, second and third fixtures 53, 54 and 55 are inserted into and fastened to the furrows of the flexible duct 30.

That is, the band-free fastener 50 makes good use of structural characteristics of the first, second and third fixtures 53, 54 and 55 and the flexible duct 30, and is used by easily fastening the flexible duct 30 in a band-free way.

Here, the band-free fastener 50 may be formed integrally with the adapter body 21 instead of the coupler (24 of FIG. 6) provided on the adapter body 21. A ring 11b can be formed inside the inflow port 11a of the inflow cover 11 to protrude in a ring shape to be able to fix a connecting means such as an air hose that connects the average pressure port 23b of the integrated pressure gauge adapter 20 and the sensor unit 17 of the cylindrical housing 10.

Therefore, according to the exemplary embodiment, the opposite ends of the flexible duct 30 can be easily fastened and connected to the inflow cover 11 and the integrated pressure gauge adapter 20 using the band-free fasteners 50, and thereby the present disclosure is effective in terms of usability for the measurement of the air flow.

Although the foregoing description and the accompanying drawings have been presented in order to explain certain principles of the present disclosure in detail, the portable air flow meter using a 3D printer according to the present disclosure is not limited thereto. It will be understood that the terms "comprise," "include," and "have," and any variations thereof used herein are intended to cover non-exclusive inclusions unless explicitly described to the contrary. Descriptions of components in the singular form are intended to include descriptions of components in the plural form, unless explicitly described to the contrary. It will be further understood that terms, such as those defined in commonly used dictionaries, should be interpreted as having a meaning that is consistent with their meaning in the context of the relevant art, and will not be interpreted in an idealized or overly formal sense, unless defined expressly so herein.

The foregoing description and the accompanying drawings have been presented in order to explain certain principles of the present disclosure. A person having ordinary skill in the art to which the present disclosure relates could make various modifications and variations by combining, dividing, substituting for or changing elements without departing from the principle of the present disclosure. The foregoing embodiments disclosed herein shall be interpreted as being illustrative only, while not being limitative, of the principle and scope of the present disclosure. It should be understood that the scope of the present disclosure shall be defined by the appended Claims and all of their equivalents fall within the scope of the present disclosure.

What is claimed is:

1. A portable air flow meter fabricated using a 3D printer comprising:
   a cylindrical housing having a nozzle cover formed integrally therewith in the front thereof into which air flows from an outside such that fabrication using the 3D printer is possible, a fixing cover on which a finishing cover is installed and which is integrally formed in the rear thereof, and a handle formed integrally therewith at an upper portion thereof;

an inflow cover installed in front of the nozzle cover, formed to pass therethrough in an axial direction to cause the air flowing in from the outside to flow into the cylindrical housing, and having first flow straightening plates installed therein;

a nozzle panel which is installed inside the nozzle cover and on which a multi-nozzle made up of nozzles that measure an air flow passing through the first flow straightening plates and have cross-sectional areas different from each other is detachably installed;

a second flow straightening plate which is disposed behind the nozzle panel and on which cylinder type opening/closing devices moving dampers forward/backward to open/close the nozzles through the dampers are installed; and a blower disposed behind the second flow straightening plate, made up of a motor and an impeller rotatably connected coaxially with the motor, suctioning air passing through the second flow straightening plate, and ejecting the air to an ejector formed on a rear outer circumferential surface of the cylindrical housing, wherein an air inductor disposed between the impeller and the second flow straightening plate to induce the air passing through the second flow straightening plate toward the blower is integrally formed inside the cylindrical housing.

2. The portable air flow meter according to claim 1, further comprising an integrated pressure gauge adapter connected to the inflow cover through the flexible duct and causing open air to flow into the cylindrical housing, wherein the integrated pressure gauge adapter includes:

an adapter body in which an air inflow space into which the open air flows is provided and at an outer portion of which a fixing flange shaped of a quadrilateral frame is provided to fix the integrated pressure gauge adapter to a measuring target and to prevent leakage of the open air by bringing the integrated pressure gauge adapter into close contact with the measuring target; and a pressure gauge made up of a static pressure tap that includes a pressure measuring hole that is formed inside the adapter body in a circular shape to measure a pressure when the open air passes through the pressure measuring hole and an average pressure port that measures an average pressure of the open air flowing into the pressure measuring hole and that is integrally formed inside the adapter body.

3. The portable air flow meter according to claim 2, further comprising a ring formed inside an inflow port of the inflow cover to protrude in a ring shape to fix a connecting means that connects the average pressure port and the sensor unit installed on the cylindrical housing for the purpose of preventing movement.

4. The portable air flow meter according to claim 3, wherein the cylindrical housing is formed integrally with pressure measuring pipes that connect a front sensor provided in the front of the cylindrical housing to constitute the sensor unit and rear sensors provided in the rear of the cylindrical housing.

5. The portable air flow meter according to claim 1, further comprising an observation window for checking opening/closing of the nozzles, which is provided on a front outer circumferential surface of the cylindrical housing such that it is checked outside the cylindrical housing whether the multi-nozzle is opened or closed by the dampers and the cylinder type opening/closing devices for driving the dampers.

6. The portable air flow meter according to claim 1, further comprising an ejecting direction turning adapter made up of a quadrilateral bracket that is formed at the same curvature as the ejector to turn an ejecting direction of internal air ejected through the ejector and is detachably installed outside the ejector, and an auxiliary ejection port that is formed integrally with the bracket and is formed in a cylindrical shape to communicate with the ejector.

7. The portable air flow meter according to claim 1, further comprising a band-free fastener configured to fasten the flexible duct to the inflow cover in a band-free way, wherein the band-free fastener comprises:

first and second cylindrical bodies configured such that rear ends thereof screwed onto the front of the inflow cover are integrally formed and front ends thereof which one end of the flexible duct formed of a corrugated tube enters are formed apart from each other; and a first fixture that is formed to protrude inward from the first cylindrical body; and second and third fixtures that are formed to protrude outward from the second cylindrical body facing the first fixture and are disposed to alternate with the first fixture.

* * * * *